(12) United States Patent
Sapozhnikov et al.

(10) Patent No.: US 9,286,921 B1
(45) Date of Patent: Mar. 15, 2016

(54) READER SENSOR STRUCTURE HAVING FRONT BOTTOM SHIELD ADJACENT RECESSED AFM LAYER

(71) Applicant: Seagate Technology LLC, Cupertino, CA (US)

(72) Inventors: Victor Boris Sapozhnikov, Minnetonka, MN (US); Mohammed Sharia Ullah Patwari, Eden Prairie, MN (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 0 days.

(21) Appl. No.: 14/521,179

(22) Filed: Oct. 22, 2014

(51) Int. Cl.
*G11B 5/39* (2006.01)
*G11B 5/11* (2006.01)

(52) U.S. Cl.
CPC ............ *G11B 5/3912* (2013.01); *G11B 5/3909* (2013.01); *G11B 2005/3996* (2013.01)

(58) Field of Classification Search
None
See application file for complete search history.

(56) References Cited

U.S. PATENT DOCUMENTS

| | | | |
|---|---|---|---|
| 6,680,830 B2 * | 1/2004 | Gill | 360/321 |
| 7,220,499 B2 * | 5/2007 | Saito et al. | 360/324.11 |
| 7,365,949 B2 * | 4/2008 | Hayakawa et al. | 360/324.1 |
| 7,370,404 B2 | 5/2008 | Gill et al. | |
| 7,423,849 B2 | 9/2008 | Gill | |
| 7,800,867 B2 * | 9/2010 | Saito et al. | 360/324.11 |
| 7,952,839 B2 * | 5/2011 | Yamazaki et al. | 360/324.1 |
| 7,961,440 B2 * | 6/2011 | Gill et al. | 360/324.11 |
| 8,000,065 B2 * | 8/2011 | Yamazaki | 360/324.11 |
| 8,395,867 B2 * | 3/2013 | Dimitrov et al. | 360/319 |
| 8,582,249 B2 | 11/2013 | Sapozhnikov et al. | |
| 8,675,318 B1 * | 3/2014 | Ho | G11B 5/3912 360/324.11 |
| 8,711,528 B1 | 4/2014 | Xiao et al. | |
| 9,001,473 B1 * | 4/2015 | Gao et al. | 360/324.11 |
| 9,042,062 B2 * | 5/2015 | Hong et al. | 360/324.11 |
| 2002/0067580 A1 * | 6/2002 | Li | G11B 5/3903 360/319 |
| 2002/0181165 A1 * | 12/2002 | Gill | G11B 5/3909 360/324.2 |
| 2006/0012924 A1 | 1/2006 | Takano | |
| 2011/0013317 A1 | 1/2011 | Kaiser et al. | |
| 2014/0168818 A1 | 6/2014 | Sapozhnikov et al. | |

* cited by examiner

*Primary Examiner* — Craig A. Renner
(74) *Attorney, Agent, or Firm* — HolzerIPLaw, PC

(57) ABSTRACT

A sensor structure that has a sensor stack comprising a recessed AFM layer, a combined pinned layer/reference layer (PL/RL) directly on the AFM layer, a free layer (FL), and a barrier layer between the PL/RL and the FL. All the magnetic layers between the AFM layer and the FL have substantially the same magnetic orientation. The sensor structure includes a top shield and a front bottom shield adjacent to the recessed AFM layer.

10 Claims, 8 Drawing Sheets

ABSTRACT
READER SENSOR STRUCTURE HAVING FRONT BOTTOM SHIELD ADJACENT RECESSED AFM LAYER

BACKGROUND

In a magnetic data storage and retrieval system, a magnetic read/write head includes a reader portion having a magnetoresistive (MR) sensor for retrieving magnetically encoded information stored on a magnetic disc. Magnetic flux from the surface of the disc causes rotation of the magnetization vector of a sensing layer of the MR sensor, which in turn causes a change in electrical resistivity of the MR sensor. The change in resistivity of the MR sensor can be detected by passing a current through the MR sensor and measuring a voltage across the MR sensor. External circuitry then converts the voltage information into an appropriate format and manipulates that information to recover the information encoded on the disc.

SUMMARY

One particular implementation described herein is a reader sensor having a bottom shield and a sensor stack. The sensor stack includes a recessed AFM layer, a combined pinned layer/reference layer (PL/RL) directly on the AFM layer, a free layer (FL), and a barrier layer between the PL/RL and the FL, where all magnetic layers between the AFM layer and the FL have substantially the same magnetic orientation. The sensor also has a front bottom shield adjacent to the recessed AFM layer.

Another particular implementation is a reader sensor structure having a bottom shield and a sensor stack. The sensor stack has a recessed AFM layer, a combined pinned layer/reference layer (PL/RL), a free layer (FL), and a barrier layer between the PL/RL and the FL. The sensor structure also has a front bottom shield adjacent to the recessed AFM layer, and the PL/RL is positively coupled to the front bottom shield.

Yet another particular implementation is a reader sensor structure having a bottom shield and a sensor stack. The sensor stack has essentially only a recessed AFM layer, a combined pinned layer/reference layer (PL/RL), a free layer (FL), and a barrier layer between the PL/RL and the FL. The sensor structure has a front bottom shield adjacent to the recessed AFM layer.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. These and various other features and advantages will be apparent from a reading of the following detailed description.

BRIEF DESCRIPTIONS OF THE DRAWING

The described technology is best understood from the following Detailed Description describing various implementations read in connection with the accompanying drawings.

Figure 3A:
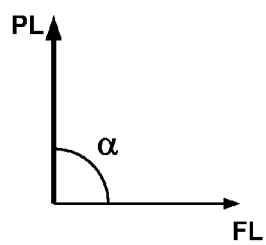
Figure 3B:
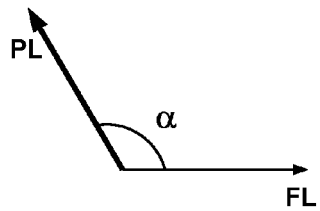
Figure 3C:
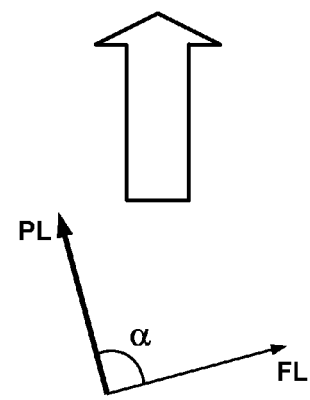

FIGS. 3A, 3B and 3C schematically illustrate three relative magnetic orientations and angles between a pinned layer (PL) and a free layer (FL).

Figure 4:
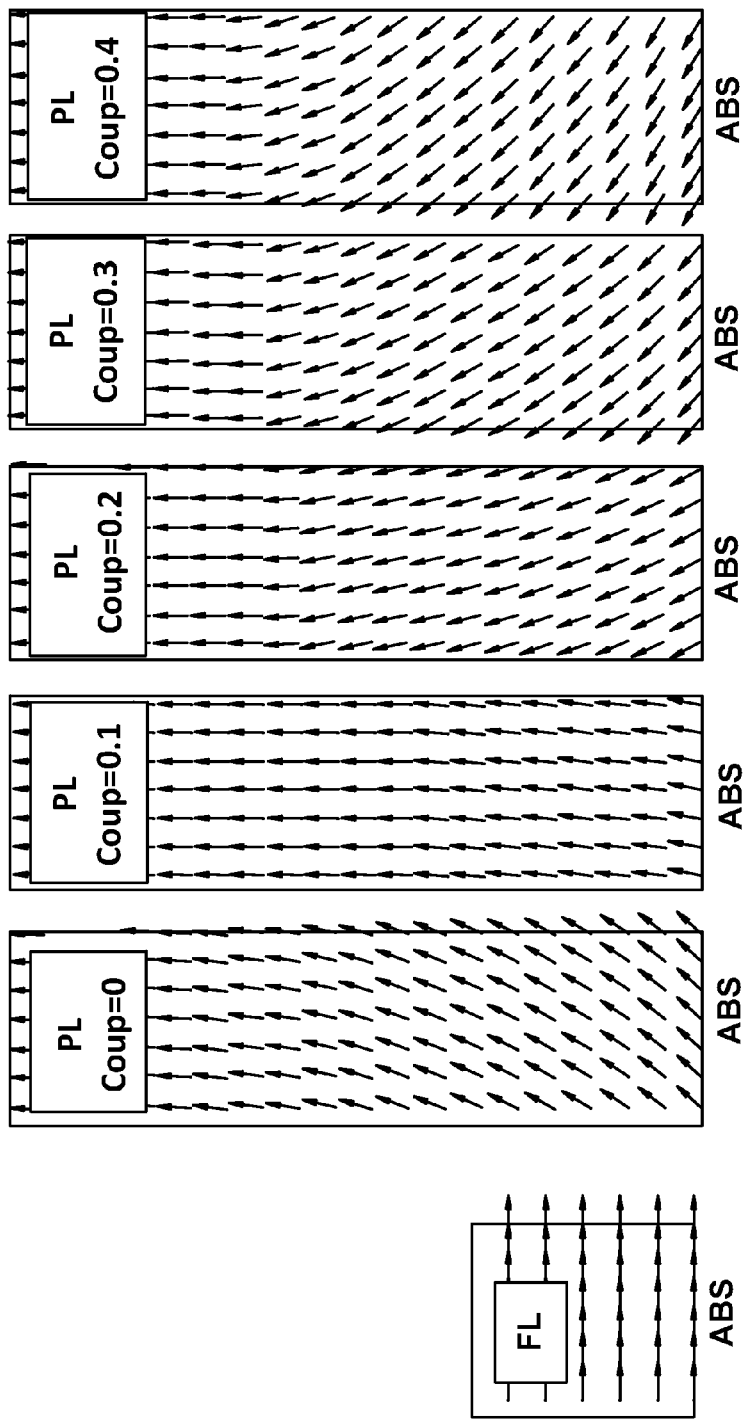

FIG. 4 illustrates a magnetic orientation of a free layer (FL) and magnetic orientations of a pinned layer (PL) at five coupling levels of the PL to a bottom shield.

Figure 5:
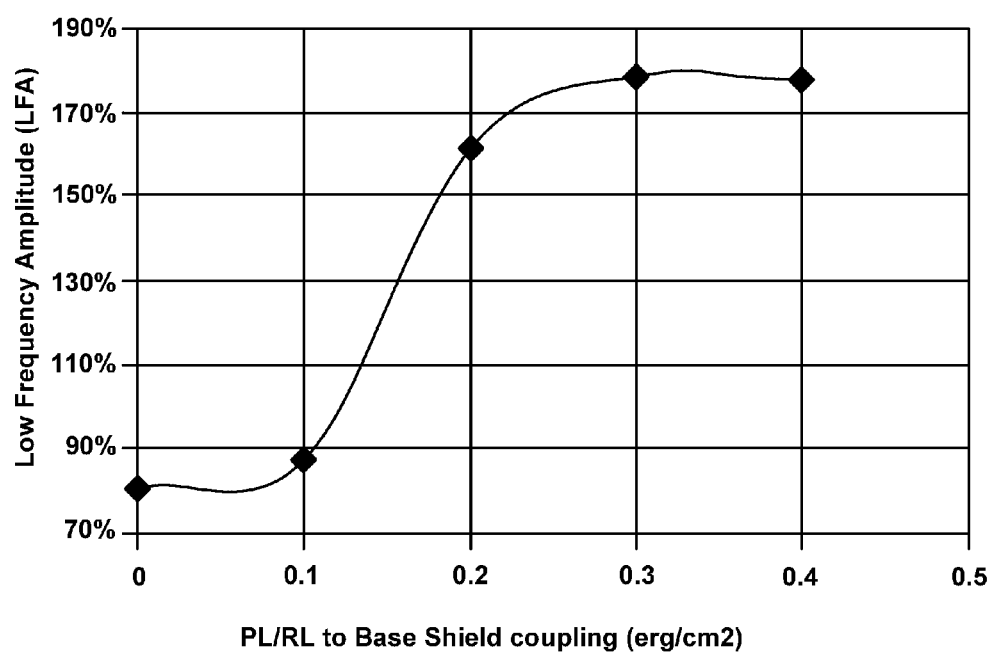

FIG. 5 is a graphical representation of the amplitude as a function of pinned layer (PL) to bottom shield coupling strength.

Figure 6:
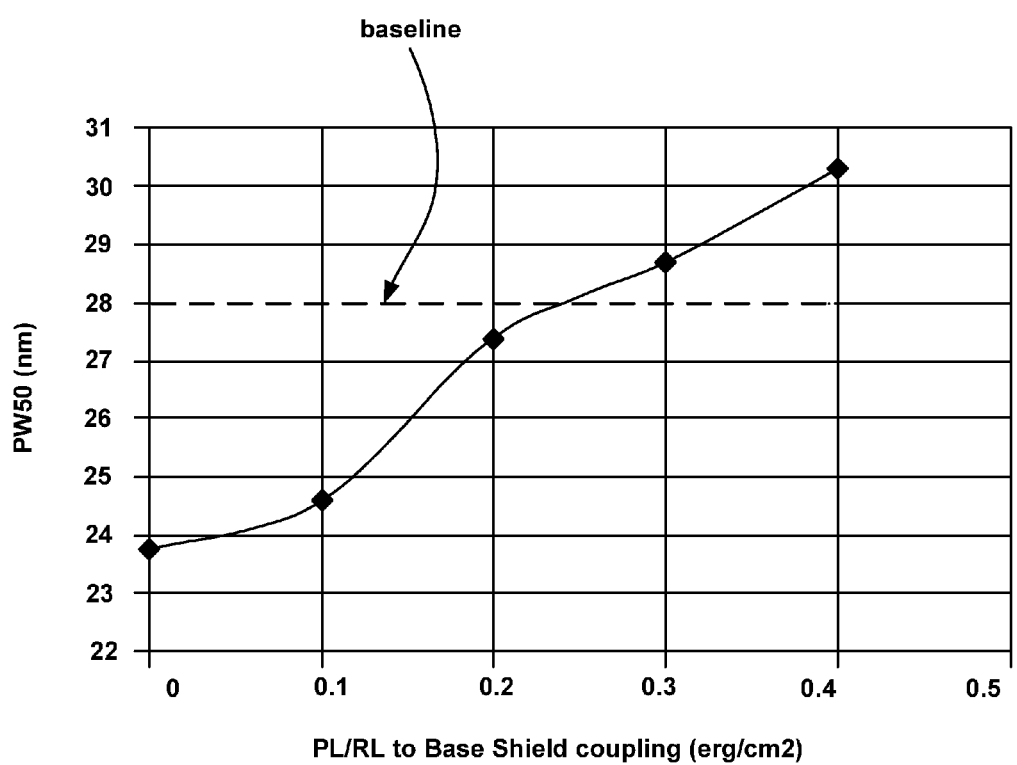

FIG. 6 is a graphical representation of PW50 as a function of pinned layer (PL) to bottom shield coupling strength.

Figure 7:
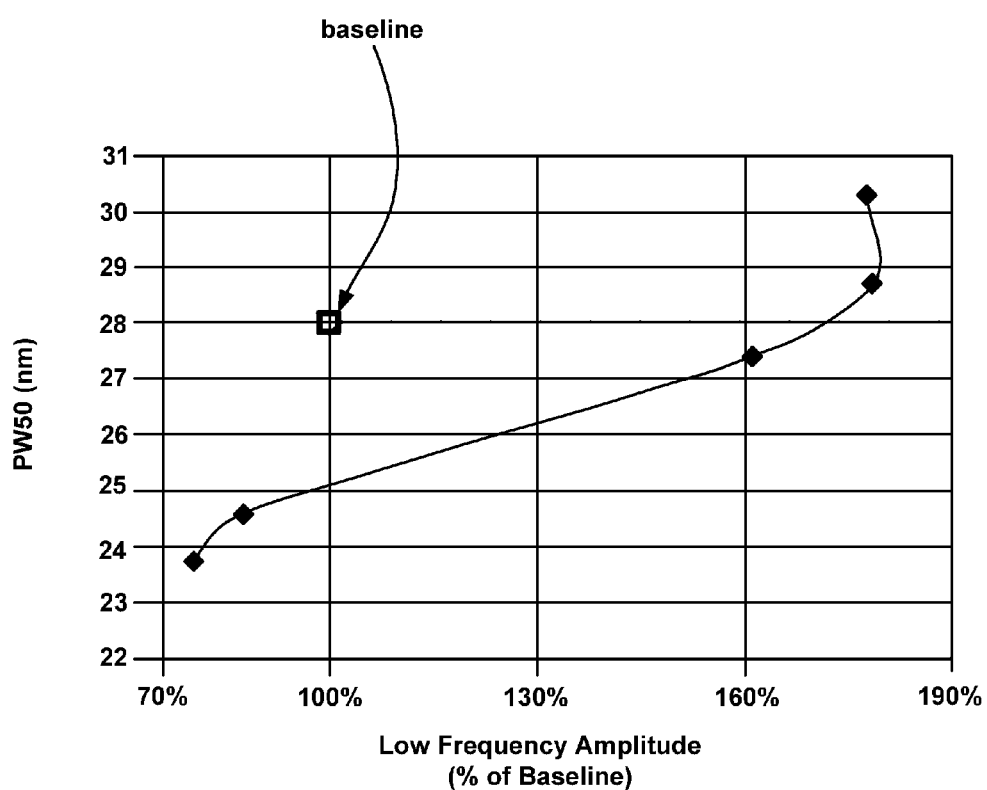

FIG. 7 is a graphical representation of PW50 as a function of low frequency amplitude (LFA).

Figure 8:
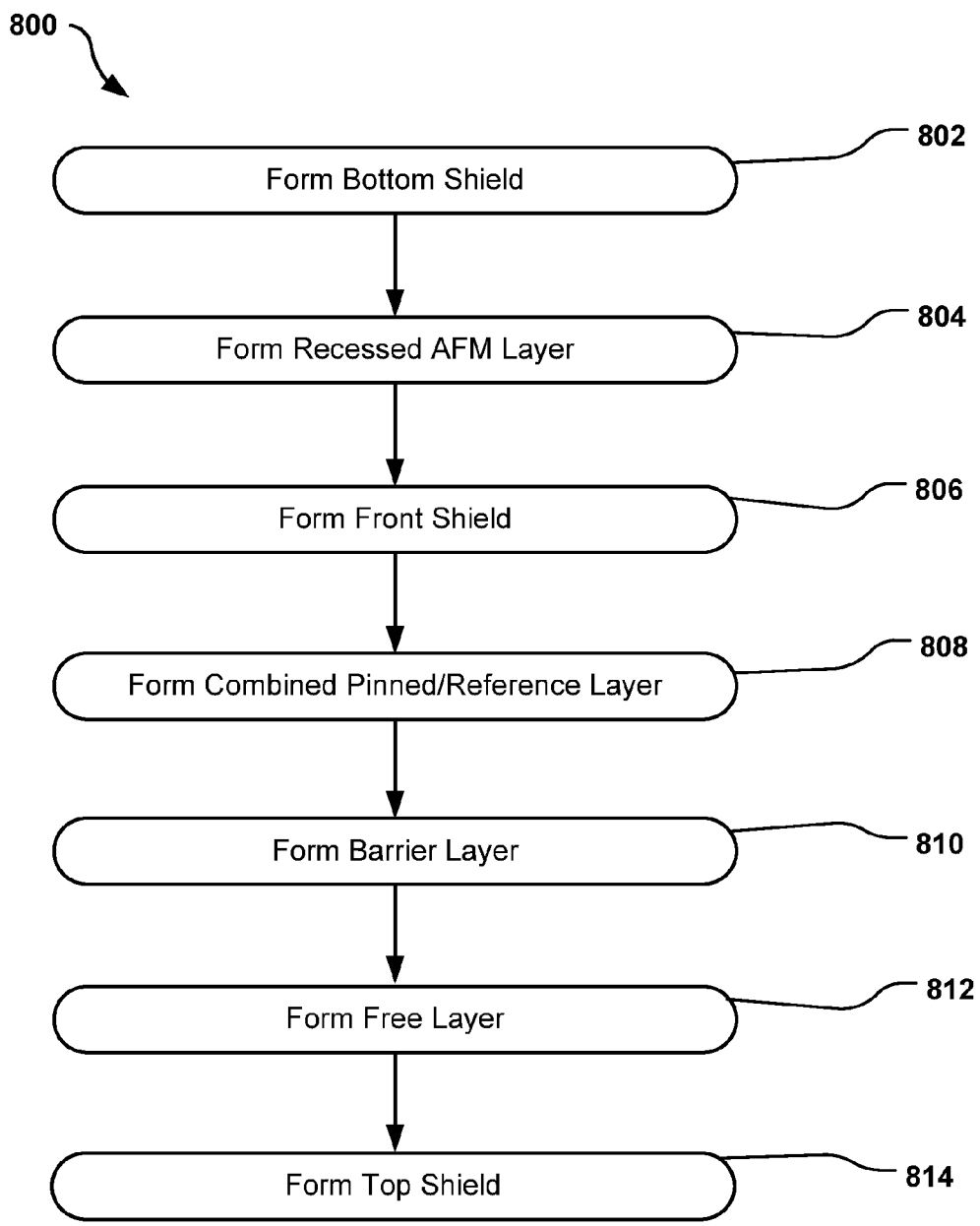

FIG. 8 is a flowchart illustrating an example method of forming an example reader sensor structure.

DETAILED DESCRIPTION

There is an increasing demand for high data densities and sensitive sensors to read data from a magnetic media. Giant Magnetoresistive (GMR) sensors commonly consist of three magnetic layers, one of which is a soft magnet, separated by a thin conductive, non-magnetic spacer layer such as copper, from the other magnetic layers. Tunnel Magnetoresistive (TMR) sensors provide an extension to GMR in which the electrons travel perpendicularly to the layers across a thin insulating tunnel barrier.

In general, for these magnetoresistive (MR) sensors, an antiferromagnetic material (AFM) layer (often called the "pinning layer") is placed adjacent to the first magnetic layer to prevent it from rotating. AFM materials exhibiting this property are termed "pinning materials". With its rotation inhibited by the AFM layer, the first layer is termed the "pinned layer" (PL). A soft magnetic layer rotates freely in response to an external field and is called the "free layer" (FL). A coupling spacer layer between the PL and the third magnetic layer, a reference layer (RL), provides an antiferromagnetic coupling (e.g., an RKKY coupling) between them, forming a synthetic antiferromagnetic (SAF) structure. The MR sensor can include other (e.g., non-magnetic) layers.

To operate the MR sensor properly, the sensor is preferably stabilized against the formation of edge domains because domain wall motion results in electrical noise that makes data recovery difficult. A common way to achieve stabilization is with a permanent magnet abutted junction design. In this scheme, permanent magnets with high coercive field (i.e., hard magnets) are placed at each end of the sensor. The field from the permanent magnets stabilizes the sensor and prevents edge domain formation, as well as provides proper bias. Another common way to provide the free layer bias is to use stabilized soft magnetic layers in place of the permanent magnets. The use of the AFM/PL allows for consistent and predictable orientation of the SAF structure. Furthermore, the use of the SAF structure stabilized by the AFM layer enables high amplitude linear response for a reader using the MR sensor.

The assembly of the various layers the MR sensors, as discussed above, is also referred to as a sensor stack. Such sensor stack may be surrounded by a bottom shield and a top shield to shield the sensor from any magnetic influences that are generated from other components of the transducer head; these shields can be referred to as bulk shields. In such an implementation, the distance between the top shield and the bottom shield is referred to as the shield-to-shield spacing (SSS). PW50, which is the pulse width of a magnetic element at 50% of the pulse amplitude, is indicative of the spatial resolution of the sensor. The PW50 of magnetic sensors, which determines the signal-to-noise (SNR) ratio in a recording system, depends on the SSS of the head. Specifically, a reduction in the SSS leads to reduction of the PW50 and therefore, an increase in the SNR for the recording system. Reduction in the SSS also leads to improved MT10/50, which is a ratio of cross-track width of a microtrack (i.e., very narrow track) readback at 50% pulse amplitude and at 10% amplitude. Similar to how PW50 characterizes down-track resolution, MT10/50 characterizes reader cross-track resolution.

An example sensor assembly disclosed herein provides PW50 improvement by reducing the SSS by elimination of at least two layers from the sensor stack, while also increasing the low frequency amplitude of the sensor. Specifically, the sensor assembly includes a reader sensor or "stack" surrounded by a bottom shield and a top shield in down-track direction, with the stack including a free layer and a combined pinned layer/reference layer, with the free layer and the combined layer, in some implementations, having an obtuse angle between their respective magnetization orientations.

It is noted that the technology disclosed herein may be used in conjunction with a variety of different types of magnetic sensors (e.g., anisotropic magnetoresistive (AMR) sensors, TMR sensors, GMR sensors, etc.). Accordingly, the implementations discussed may also be applicable to new sensor designs that are based on new physical phenomena such as lateral spin valve (LSV), spin-hall effect (SHE), spin torque oscillation (STO), etc.

In the following description, reference is made to the accompanying drawing that forms a part hereof and in which are shown by way of illustration at least one specific implementation. The following description provides additional specific implementations. It is to be understood that other implementations are contemplated and may be made without departing from the scope or spirit of the present disclosure. The following detailed description, therefore, is not to be taken in a limiting sense. While the present disclosure is not so limited, an appreciation of various aspects of the disclosure will be gained through a discussion of the examples provided below.

Figure 1:
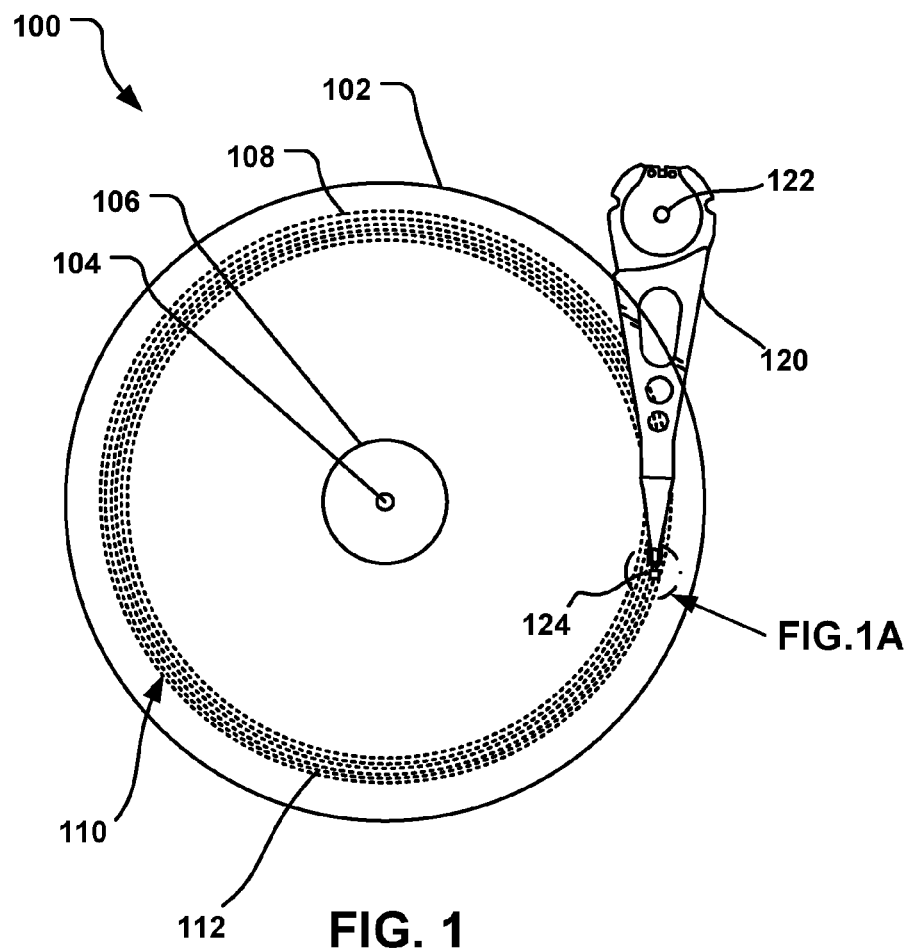
FIG. 1 is a perspective view of an example recording device using a reader having a sensor structure disclosed herein.

FIG. 1 illustrates a perspective view of an example recording device 100 using a reader disclosed herein. Recording device 100 includes a disc 102, which rotates about a spindle center or a disc axis of rotation 104 during operation. The disc 102 includes a functional inner diameter 106 and a functional outer diameter 108 between which are a number of concentric data tracks 110, illustrated by dashed lines. The data tracks 110 are substantially circular and are made of regularly spaced patterned bits 112, indicated as dots or ovals on the disc 102. It should be understood, however, that the described technology may be employed with other types of storage media, including continuous magnetic media, discrete track (DT) media, etc.

Information may be written to and read from the bits 112 on the disc 102 in different data tracks 110. A transducer head 124 is mounted on an actuator assembly 120 at an end distal to an actuator axis of rotation 122; the transducer head 124 flies in close proximity above the surface of the disc 102 during disc operation, with the surface of the transducer head 124 proximate to the disc 102 being referred to as an air-bearing surface (ABS). The actuator assembly 120 rotates during a seek operation about the actuator axis of rotation 122 positioned adjacent to the disc 102. The seek operation positions the transducer head 124 over a target data track of the data tracks 110.

Figure 1A:
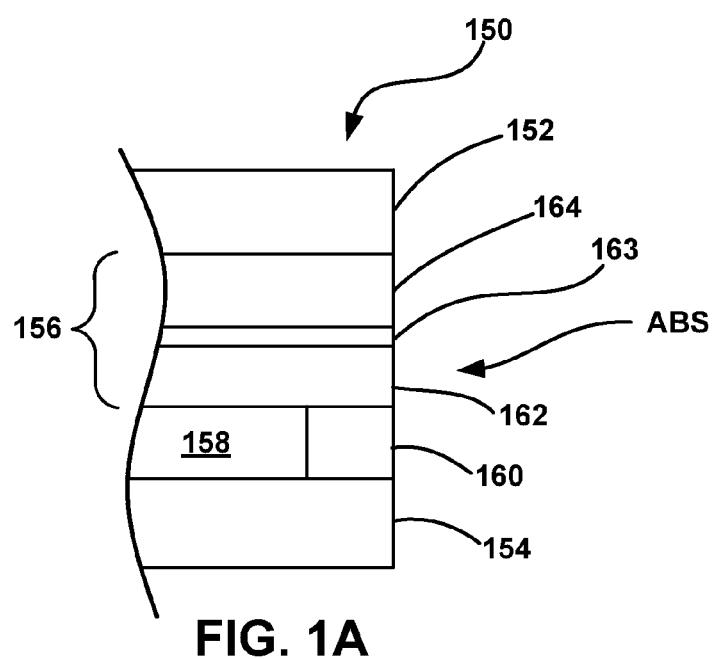
FIG. 1A is an enlarged view of a portion of the sensor structure.

FIG. 1A illustrates an expanded view of the transducer head 124, with a reader sensor 150 illustrated by a schematic block diagram that illustrates a side view of the reader sensor 150, taken orthogonal to the ABS of the reader sensor 150. In the illustrated implementation, the reader sensor 150 is illustrated to include a top shield 152 and a bottom shield 154, with a sensor stack 156 between the shields 152, 154 along the down-track direction of the reader 150. The top shield 152 and the bottom shield 154 protect the sensor stack 156 from flux from adjacent data tracks 110 on the disc 102. All the details of which are not shown, the sensor stack 156 includes multiple layers, including an AFM layer 158, a combined PL/RL 162, a free layer (FL) 164 and a barrier layer 163 therebetween. The combined PL/RL 162, FL 164 and the barrier layer 163 extend to the ABS, but the AFM layer 158 is recessed from the ABS and as such does not contribute to an effective SSS. The recess or area voided by the recessed AFM layer 158 has a front shield 160.

In some implementations, the combined PL/RL 162 is magnetically coupled to the front shield 160; this coupling results in a canted magnetization direction for the combined PL/RL 162. That is, the combined PL/RL 162 has a magnetic orientation that is canted at an angle between 90 degrees and 180 degrees in respect to the magnetic orientation of the FL 164. This angle can be referred to as an obtuse angle.

Figure 2A:
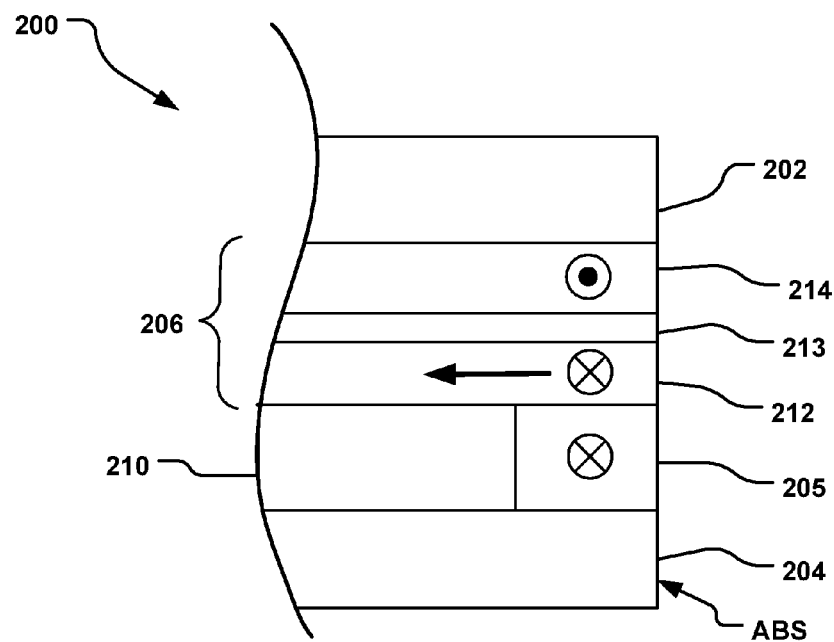
FIG. 2A is a schematic side view of an example reader sensor structure.
Figure 2B:
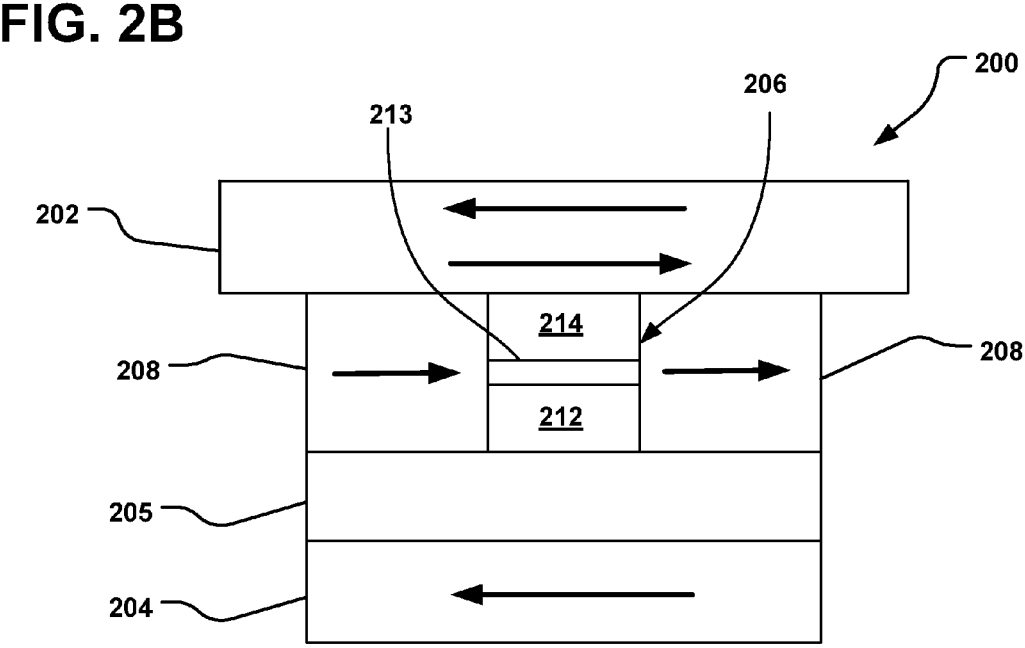
FIG. 2B is a schematic air-bearing surface (ABS) view of the example reader sensor structure.

FIG. 2A illustrates a portion of a reader sensor 200 in a view orthogonal to the ABS surface, and FIG. 2B illustrates an ABS view of the reader sensor 200. The reader 200 includes a top shield 202 and a base or bottom shield 204; either or both or top shield 202 and bottom shield 204 can be composed of a single shield material or be a composite structure. The shields 202, 204 are made of soft magnetic materials such as NiFe and CoNiFe; these soft magnetic materials have low magnetic anisotropy (Hk) and low coercivity, which serve to shield the individual layers of the reader sensor 200 from magnetic interference from other devices or components and from adjacent magnetic domains on a magnetic medium (e.g., the disc 102 of FIG. 1). Between shields 202, 204 (in a down-track direction) is a sensor stack 206 that has multiple layers, described below. Also between top shield 202 and bottom shield 204 (in the cross-track or lateral direction to the sensor stack 206), seen in FIG. 2B, are side shields 208, which shield the sensor stack 206 from magnetic interference from other nearby devices or components and from cross-track magnetic domains on the storage medium (e.g., the disc 102 of FIG. 1). In the illustrated implementation, the side shields 208 encompass all layers of the sensor stack 206, however in other implementations, the side shields 208 may not encompass one or more of the layers that form the sensor stack 206. The side shields 208 are made of low coercivity materials, such as soft magnetic metals like NiFe and CoNiFe. Alternatively the shields 208 can be replaced by permanent magnets (PM).

The sensor structure 200 includes an AFM layer 210 (seen in FIG. 2A) recessed from the ABS, in one implementation, about 10 nm to 500 nm. The area or recess between the ABS and the AFM layer 210 has a front bottom shield 205, or merely, front shield 205; due to the presence of the front bottom shield 205, the AFM layer 210 is not seen in the ABS view of FIG. 2B.

The sensor stack 206 includes a combined pinned layer and reference layer (PL/RL) 212, a free layer (FL) 214 and a barrier 213 between the PL/RL 212 and the FL 214, which allows for the different magnetization directions of the combined PL/RL 212 and the FL 214. In various implementations, each the combined PL/RL 212 and the FL 214 are made of a soft ferromagnetic or synthetic ferromagnetic material, such as CoFe, NiFe, CoNiFe, and CoFeB. The barrier layer 213 can be made of $Al_2O_3$, TiO, TaO, MgO, or other oxides, for example.

A seed layer (not shown) may be present between the AFM layer 210 and the combined PL/RL 212 to promote the texture and the grain growth of the layer that is subsequently grown on top of the seed layer. The seed layer is chosen such that its atomic structure (or arrangement) corresponds with a preferred crystallographic direction of the AFM layer 210 and other layers of the sensor stack 206. The seed layer can be made of a non-magnetic metal or metal alloy (e.g., Ta, Ru, Cr, Pt, Pd, and NiCr) or a magnetic metal or metal alloy (e.g., NiFeCr, NiFeW, NiFeMo).

The combined PL/RL 212 in the sensor structure 200 replaces three layers from a typical sensor stack: the pinned layer, the reference layer and the non-magnetic layer (e.g, Ru layer) that is present between those layers. The combined PL/RL 212 has a thickness (taken in the downtrack direction) similar to a single layer, e.g., about 1 to 15 nm. By removing three layers and replacing them with the combined PL/RL 212, the shield-to-shield spacing (SSS) of the sensor structure 200 is reduced. Additionally, because the AFM layer 210 is recessed from the ABS, the AFM layer 210 does not contribute to the SSS and thus the SSS is further reduced. This reduced SSS leads to reduced (improved) PW50 and MT10/50, and therefore, an increase in the SNR for the recording system that utilizes the sensor structure 200.

Exemplary magnetization orientations of the various layers of the sensor structure 200 are illustrated in FIGS. 2A and 2B. The combined PL/RL 212 may be coupled to the front bottom shield 205; in some implementations, this coupling is a generally weak coupling, of about 0.06 to 0.6 $erg/cm^2$, although in some implementations it may be no greater than 0.4 $erg/cm^2$ or 0.2 $erg/cm^2$. However, although the magnetization direction the PL/RL 212 has the same directional component as the front bottom shield 205, the combined PL/RL 212 also has a second directional component, thus resulting in an overall magnetization orientation for the PL/RL 212 that is canted at an obtuse angle in relation to the front bottom shield 205. This obtuse angle of the magnetization orientation for the PL/RL 212 is between 90 degrees and 180 degrees in respect to the magnetic orientation of the FL 214, which is biased by the side shields 208.

In an alternate implementation, no coupling is present between the combined PL/RL 212 and the front bottom shield 205. In such an implementation, the magnetization orientation of the combined PL/RL 212 and the FL 214 is at an acute angle.

The sensor stack 206 may have additional layers than those illustrated in FIGS. 2A and 2B, such as, for example, seed layer(s), a capping layer, etc. Any additional magnetic layers that may be present between the AFM layer 210 and the FL 214 have substantially the same magnetic orientation as the FL 214. In some implementations, the sensor structure 200 has no synthetic antiferromagnetic (SAF) structure.

FIGS. 3A through 3C illustrate three embodiments of relative magnetization orientations for a free layer (FL) and a reference layer (RL). FIG. 3A illustrates a right angle α (90 degrees) between the RL magnetization orientation and the FL magnetization orientation; such an angle is typical for a sensor stack having a non-recessed AFM layer. FIG. 3B illustrates an obtuse angle α between the combined PL/RL magnetization orientation and the FL magnetization orientation; such an obtuse angle α is obtained with a sensor structure as illustrated in FIGS. 2A and 2B, having a combined PL/RL and recessed AFM layer, with the combined PL/RL coupled to the front shield that fills the recess from the AFM layer.

When a magnetic field is applied to the illustration of FIG. 3B in the direction indicated in FIG. 3C (for example, by a magnetic medium (e.g., disc 102 in FIG. 1)), the combined PL/RL magnetization orientation and the FL magnetization orientation both veer or twist in the direction of the magnetic field, and thus the angle α decreases. This rotation of the magnetization orientations of the two layers in opposite directions strengthens the amplitude signal and it also lowers the asymmetry of the sensor.

Various implementations of reader sensors were modeled, with a sensor stack having a free layer (FL), and a combined pinned layer and a reference layer (PL/RL) optionally coupled to a front bottom shield of a recessed AFM layer. FIG. 4 shows the magnetization orientation of the FL and five implementations, A through E, of five different coupling strengths between the combined PL/RL and the front bottom shield. In Implementation A, the coupling is 0 (zero, i.e., no coupling), and the modeling shows that the magnetization orientation of the combined PL/RL in the vicinity of the ABS (which is the part of PL/RL responsible for producing signal) forms an acute angle of about 45 degrees with the FL. In Implementation B, the coupling is 0.1 $erg/cm^2$ and the modeling shows that the magnetization orientation of the combined PL/RL in the vicinity of the ABS is almost perpendicular angle to perpendicular (90 degrees) to the FL. In Implementation C, the coupling is 0.2 $erg/cm^2$ and the modeling shows that the magnetization orientation of the combined PL/RL near the ABS forms an obtuse angle (of about 120 degrees) with the FL. In Implementation D, the coupling is 0.3 $erg/cm^2$ and the modeling shows that the magnetization orientation of the combined PL/RL in the vicinity of the ABS forms an obtuse angle (of about 135 degrees) with the FL. In Implementation E, the coupling is 0.4 $erg/cm^2$ and the modeling shows that the magnetization orientation of the combined PL/RL in the vicinity of the ABS forms an obtuse angle (of about 150-160 degrees) with the FL.

FIG. 5 graphically illustrates the relationship between the low frequency amplitude of the sensor structure and the combined PL/RL coupling strength to the front shield, based on the modeling of FIG. 4. By coupling the combined PL/RL to the front bottom shield, a large gain in amplitude is achieved. As seen in FIG. 5, the amplitude increases to approximately 160% of baseline (which is a conventional, AFM supported reader sensor structure having a separate pinned layer and reference layer) when the coupling is 0.2 $erg/cm^2$ and increases to approximately 180% of baseline when the coupling is 0.3-0.4 $erg/cm^2$. FIG. 6 graphically illustrates the relationship of PW50 and combined PL/RL coupling strength to the front shield. At 0 (zero) coupling, the sensor structure has a PW50 that is 4.3 nm lower (improved) than baseline. As the coupling increases (which also increases amplitude, as shown in FIG. 5) the PW50 increases. At approximately 0.24 $erg/cm^2$, the PW50 has increased to the baseline. Based on the results in FIGS. 5 and 6, a tradeoff between PW50 and amplitude is seen.

FIG. 7 graphically illustrates an acceptable tradeoff between PW50 and low frequency amplitude. The modeling shows that the sensor structure of the present disclosure, having a recessed AFM layer and a combined PL/RL coupled to a front bottom shield, can achieve better PW50 for the sample amplitude as a conventional, AFM supported reader sensor structure having a separate pinned layer and reference layer. Additionally, the modeling shows that the sensor structure of the present disclosure, having a recessed AFM layer and a combined PL/RL coupled to a front bottom shield, can achieve the same PW50 with a better amplitude than a conventional, AFM supported reader sensor structure having a separate pinned layer and reference layer. The coupling strength between the PL/RL and the front bottom shield can also be adjusted such that both the amplitude and PW50 are improved over a conventional, AFM supported reader sensor structure having a separate pinned layer and reference layer.

The sensor structure of the present disclosure, having a recessed AFM layer and a combined PL/RL coupled to a front bottom shield, is also improved over a sensor structure having a recessed AFM layer and a separate pinned layer and reference layer, since the amplitude is higher due to the PL/RL magnetization orientation being canted and the PW50 is lower due to the lower SSS.

The particular features of a sensor structure according to this disclosure can be tailored to the system in which it will be used. For example, for systems having high linear density, a lower (better) PW50 is desired more than for lower linear density systems, where the amplitude is more important. One particular example of a sensor structure according to this disclosure for systems having higher linear density (kBPI) has an AFM layer recessed 60 nm from the ABS and a combined pinned layer/reference layer not coupled to the front shield. For such example, the amplitude is 80% of baseline (i.e., baseline having a recessed AFM but separated pinned layer and reference layer), the ISI asymmetry is −2%, and the PW50 is 4.3 nm lower (an improvement) than baseline. Another particular example of a senor structure according to this disclosure for systems having lower linear density (kBPI) has an AFM layer recessed 60 nm from the ABS, a combined pinned layer/reference layer that is weakly and positively coupled (about 0.2 erg/cm$^2$) to the front bottom shield, and the front bottom shield is magnetized against the free layer. For such example, the amplitude is 160% of baseline, the ISI asymmetry is 5%, and the PW50 is 0.5 nm lower (an improvement) than baseline.

All of the read sensor structures described above, e.g., reader sensor structure 200, and variations thereof, can be fabricated by conventional methods, including plating, deposition, etching, milling, and other conventional processing techniques.

In reference now to FIG. 8, a flowchart illustrates an example method 800 for forming a reader sensor having a recessed AFM layer and a single PL/RL, such as the sensor 200 of FIG. 2. The method involves operation 802 of forming a bottom shield layer on a substrate. This operation does not require forming the bottom shield directly on the substrate, as intervening materials/layers may be present between the bottom shield and substrate. A recessed AFM layer is formed on the bottom shield in operation 804. Again, this operation does not require forming the AFM layer directly on the bottom shield, as intervening materials/layers may be present between the AFM layer and the bottom shield. The area of recess is filled with a front bottom shield in operation 806. It is noted that in some methods, operation 806 (forming the front shield) may be done prior to or simultaneously with operation 804 (forming the recessed AFM layer).

A sensor stack is formed on the bottom shield in operations 808 through 812. This operation does not require forming the sensor stack directly on the AFM layer and/or front bottom shield, as intervening materials/layers may be present between the AFM layer, front bottom shield and sensor stack. In operation 808, a combined pinned layer/reference layer is formed. A barrier layer is formed in operation 810 and then a free layer is formed in operation 812 on the barrier layer. A top shield is formed in operation 814 over the sensor stack.

The above specification and examples provide a complete description of the structure and use of exemplary implementations of the invention. The above description provides specific implementations. It is to be understood that other implementations are contemplated and may be made without departing from the scope or spirit of the present disclosure. The above detailed description, therefore, is not to be taken in a limiting sense. While the present disclosure is not so limited, an appreciation of various aspects of the disclosure will be gained through a discussion of the examples provided.

Unless otherwise indicated, all numbers expressing feature sizes, amounts, and physical properties are to be understood as being modified by the term "about." Accordingly, unless indicated to the contrary, the numerical parameters set forth are approximations that can vary depending upon the desired properties sought to be obtained by those skilled in the art utilizing the teachings disclosed herein.

As used herein, the singular forms "a", "an", and "the" encompass implementations having plural referents, unless the content clearly dictates otherwise. As used in this specification and the appended claims, the term "or" is generally employed in its sense including "and/or" unless the content clearly dictates otherwise.

Spatially related terms, including but not limited to, "bottom," "lower", "top", "upper", "beneath", "below", "above", "on top", "on," etc., if used herein, are utilized for ease of description to describe spatial relationships of an element(s) to another. Such spatially related terms encompass different orientations of the device in addition to the particular orientations depicted in the figures and described herein. For example, if a structure depicted in the figures is turned over or flipped over, portions previously described as below or beneath other elements would then be above or over those other elements.

Since many implementations of the invention can be made without departing from the spirit and scope of the invention, the invention resides in the claims hereinafter appended. Furthermore, structural features of the different implementations may be combined in yet another implementation without departing from the recited claims.

What is claimed is:

1. A sensor structure comprising:
   a bottom shield;
   a sensor stack comprising:
      a recessed AFM layer,
      a combined pinned layer/reference layer (PL/RL),
      a free layer (FL),
      a barrier layer between the PL/RL and the FL;
   a front bottom shield adjacent to the recessed AFM layer, with the PL/RL positively coupled to the front bottom shield.

2. The sensor structure of claim 1, wherein the coupling between the PL/RL and the front bottom shield is no greater than 0.6 erg/cm$^2$.

3. The sensor structure of claim 1, wherein the coupling between the PL/RL and the front bottom shield is no greater than 0.4 erg/cm$^2$.

4. The sensor structure of claim 1, wherein the coupling between the PL/RL and the front bottom shield is no greater than 0.2 erg/cm$^2$.

5. The sensor structure of claim 1, wherein the FL has a magnetic orientation and the PL/RL has a magnetic orientation, with the PL/RL magnetic orientation forming an obtuse angle to the FL magnetic orientation.

6. The sensor structure of claim 1, wherein the PL/RL has a thickness of 1 to 15 nm.

7. The sensor structure of claim 1, wherein the sensor stack is free of any SAF structure.

8. A sensor structure comprising:
   a bottom shield;

a sensor stack consisting essentially of:
- a recessed AFM layer,
- a single combined pinned layer/reference layer (PL/RL),
- a free layer (FL), and
- a barrier layer between the PL/RL and the FL; and a front bottom shield adjacent to the recessed AFM layer, with the PL/RL positively coupled to the front bottom shield.

9. The sensor structure of claim 8, wherein the FL has a magnetization orientation and the PL/RL has a magnetization orientation, with the PL/RL magnetization orientation forming an obtuse angle with the FL magnetization orientation.

10. The sensor structure of claim 8, wherein the FL has a magnetization orientation and the PL/RL has a magnetization orientation, with the PL/RL magnetization orientation forming an angle with the FL magnetization orientation.

\* \* \* \* \*